(12) United States Patent
McCallum et al.

(10) Patent No.: US 9,533,384 B1
(45) Date of Patent: Jan. 3, 2017

(54) METHOD AND APPARATUS FOR ACCURATELY POSITIONING AUTOMATED MODULAR TOOLING

(71) Applicant: Norgren Automation Solutions, LLC, Saline, MI (US)

(72) Inventors: Scott R. McCallum, St. Clair, MI (US); Roger Allen James, Northville, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 565 days.

(21) Appl. No.: 13/853,616

(22) Filed: Mar. 29, 2013

Related U.S. Application Data

(60) Provisional application No. 61/617,408, filed on Mar. 29, 2012.

(51) Int. Cl.
 *G06F 19/00* (2011.01)
 *B23P 11/00* (2006.01)

(52) U.S. Cl.
 CPC ........................ *B23P 11/00* (2013.01)

(58) Field of Classification Search
 CPC .................. B23P 11/00; G05B 19/39
 See application file for complete search history.

(56) References Cited

U.S. PATENT DOCUMENTS

| | | |
|---|---|---|
| 4,723,766 A | 2/1988 | Beeding |
| 5,072,399 A * | 12/1991 | Laws et al. ............. 700/187 |
| 5,546,314 A | 8/1996 | Brost et al. |
| 5,829,151 A | 11/1998 | Collier et al. |
| 6,145,212 A | 11/2000 | Geise et al. |
| 6,249,985 B1 | 6/2001 | Piko et al. |
| 6,298,572 B1 | 10/2001 | McAuley |
| 6,416,273 B1 | 7/2002 | Herbermann et al. |
| 6,671,572 B1 * | 12/2003 | Craft et al. ............. 700/184 |
| 6,823,604 B2 | 11/2004 | Kato |
| 7,748,107 B2 | 7/2010 | Hurst et al. |
| 2011/0037212 A1 | 2/2011 | Marrinan et al. |
| 2011/0037213 A1 | 2/2011 | Marrinan et al. |

* cited by examiner

*Primary Examiner* — Mohammad Ali
*Assistant Examiner* — Sheela S Rao
(74) *Attorney, Agent, or Firm* — Young Basile Hanlon & MacFarlane P.C.

(57) ABSTRACT

A method for accurately assembling and positioning a modular tooling structure for manipulating a workpiece includes receiving, at one or more computers, three-dimensional model information describing the workpiece; generating, at the one or more computers, three dimensional design information representing a configuration for the modular tooling structure, wherein the three dimensional design information includes position data describing a position for at least one engaging member of the modular tooling structure with respect to the workpiece; positioning a multidimensional gauge with respect to a base structure based on the position data; and assembling the modular tooling structure using the design information such that a first end of the modular tooling structure is connected to the base structure and the at least one engagement member is positioned at a second end of the modular tooling structure and is in engagement with the multi-dimensional gauge.

20 Claims, 8 Drawing Sheets

METHOD AND APPARATUS FOR ACCURATELY POSITIONING AUTOMATED MODULAR TOOLING

CROSS-REFERENCE TO RELATED APPLICATIONS

This application claims the benefit of U.S. Provisional Patent Application No. 61/617,408, which was filed on Mar. 29, 2012, and is incorporated herein by reference in its entirety.

TECHNICAL FIELD

The disclosure relates to accurately positioning automated modular tooling, and more particularly, a method and apparatus that allows for the accurate assembling and positioning of automated modular tooling without the use of a sample workpiece or model.

BACKGROUND

It is well-known in the manufacturing industry to use automated modular tooling to engage and move various workpieces to predetermined locations for performing various machining on and/or assembling of the workpieces. Such automated modular tooling may comprise adjustable arms, boom rods, and/or various clamps and elbows which are ultimately connected to various workpiece-engaging devices, such as vacuum cups, grippers, clamps, etc. The automated modular tooling may also be connected to larger boom rods or bars that are in turn connected to robotic arms, manipulators, or other machinery, such as stamping presses. Thus, the workpiece-engaging devices engage the workpiece at one end of the automated modular tooling, while the other end of the automated modular tooling is connected to a robotic arm or manipulator for moving the workpiece to a desired location.

When assembling the automated modular tooling, the assembler must determine where the workpiece-engaging device, such as the vacuum cups, grippers, and/or clamps, are to be located relative to the workpiece. To accomplish this task, the assembler must determine the length, spacing, and angular orientation in which the individual pieces of the automated modular tooling should be assembled in order for the vacuum cups, grippers, and/or clamps to be properly positioned in a predetermined geometric orientation. This is typically accomplished by utilizing a sample workpiece as a gauge so that the assembler can determine the proper position of the automated modular tooling. This is a costly and timely process, as the assembler must obtain a sample workpiece from the end user, and the assembler must either use the actual workpiece as a gauge, or the assembler must create a model of the sample workpiece if the end user cannot provide the assembler with a sample workpiece. Either way, the assembler must use an actual workpiece or model of the workpiece in order to assemble the automated modular tooling. Coordinating, receiving, handling, preparing, and storing the workpiece and/or the model of the workpiece adds time and cost to the process of assembling the automated modular tooling.

The size and weight of such workpieces can also create problems for the assembler. For instance, in the automotive industry, such workpieces may comprise large sheet metal panels such as fenders, doors, and hoods of automobiles. Handling such large workpiece samples or models can be rather difficult, especially if the workpiece or model is large in size and/or heavy in weight. When the workpiece or model is large and/or heavy, such workpieces or models typically require two or more assemblers in which to manipulate the workpiece or model into its proper position for assembling the automated modular tooling. By requiring two or more assemblers to handle such workpieces or models, the cost and time of assembling the automated modular tooling is increased.

The disadvantages in using a sample workpiece or model in assembling and positioning automated modular tooling, as noted above, leads to inefficiencies in the assembling and positioning of the automated modular tooling that are undesirable in an industrial environment. It would be desirable to create a method and apparatus for accurately assembling and positioning automated modular tooling without the use or need of a sample workpiece or model of the workpiece.

SUMMARY

One aspect of the disclosed embodiments is a method for accurately assembling and positioning a modular tooling structure for manipulating a workpiece. The method includes receiving, at one or more computers, three-dimensional model information describing the workpiece; generating, at the one or more computers, three dimensional design information representing a configuration for the modular tooling structure, wherein the three dimensional design information includes position data describing a position for at least one engaging member of the modular tooling structure with respect to the workpiece; positioning a multi-dimensional gauge with respect to a base structure based on the position data; and assembling the modular tooling structure using the design information such that a first end of the modular tooling structure is connected to the base structure and the at least one engagement member is positioned at a second end of the modular tooling structure and is in engagement with the multi-dimensional gauge.

Another aspect of the disclosed embodiments is that they include receiving, at one or more computers, three-dimensional model information describing the workpiece; generating, at the one or more computers, three dimensional design information representing a configuration for the modular tooling structure, wherein the three dimensional design information includes position data describing a position for at least one engaging member of the modular tooling structure with respect to the workpiece; positioning a multi-dimensional gauge with respect to a base structure based on the position data by positioning the multi-dimensional gauge with respect to a table having position indicia thereon based on the position data and setting at least one adjustable portion of the multi-dimensional gauge based on the position data; and assembling the modular tooling structure using the design information such that a first end of the modular tooling structure is connected to the base structure and the at least one engagement member is positioned at a second end of the modular tooling structure and is in engagement with a locating structure of the multi-dimensional gauge.

Another aspect of the disclosed embodiments is a method for accurately assembling and positioning a modular tooling structure for manipulating a workpiece that includes receiving, at one or more computers, three-dimensional model information describing the workpiece; generating, at the one or more computers, three dimensional design information representing a configuration for the modular tooling structure, wherein the three dimensional design information includes position data describing a position for at least one engaging member of the modular tooling structure with respect to the workpiece, and the position data includes an x-value, a y-value, a z-value, and at least one rotation value; positioning a multi-dimensional gauge with respect to a base structure based on the position data by positioning the multi-dimensional gauge with respect to a table having position indicia thereon based on the x-value and the y-value from the position data, setting a height of a locating structure of the multi-dimensional gauge according to the z-value, and rotationally adjusting a first rotationally adjustable structure of the multi-dimensional gauge based on a first rotation value; and assembling the modular tooling structure using the design information such that a first end of the modular tooling structure is connected to the base structure and the at least one engagement member is positioned at a second end of the modular tooling structure and is in engagement with the locating structure of the multi-dimensional gauge.

BRIEF DESCRIPTION OF THE DRAWINGS

The description herein makes reference to the accompanying drawings, wherein like-reference numerals refer to like parts throughout several views and wherein.

DETAILED DESCRIPTION

Figure 1:
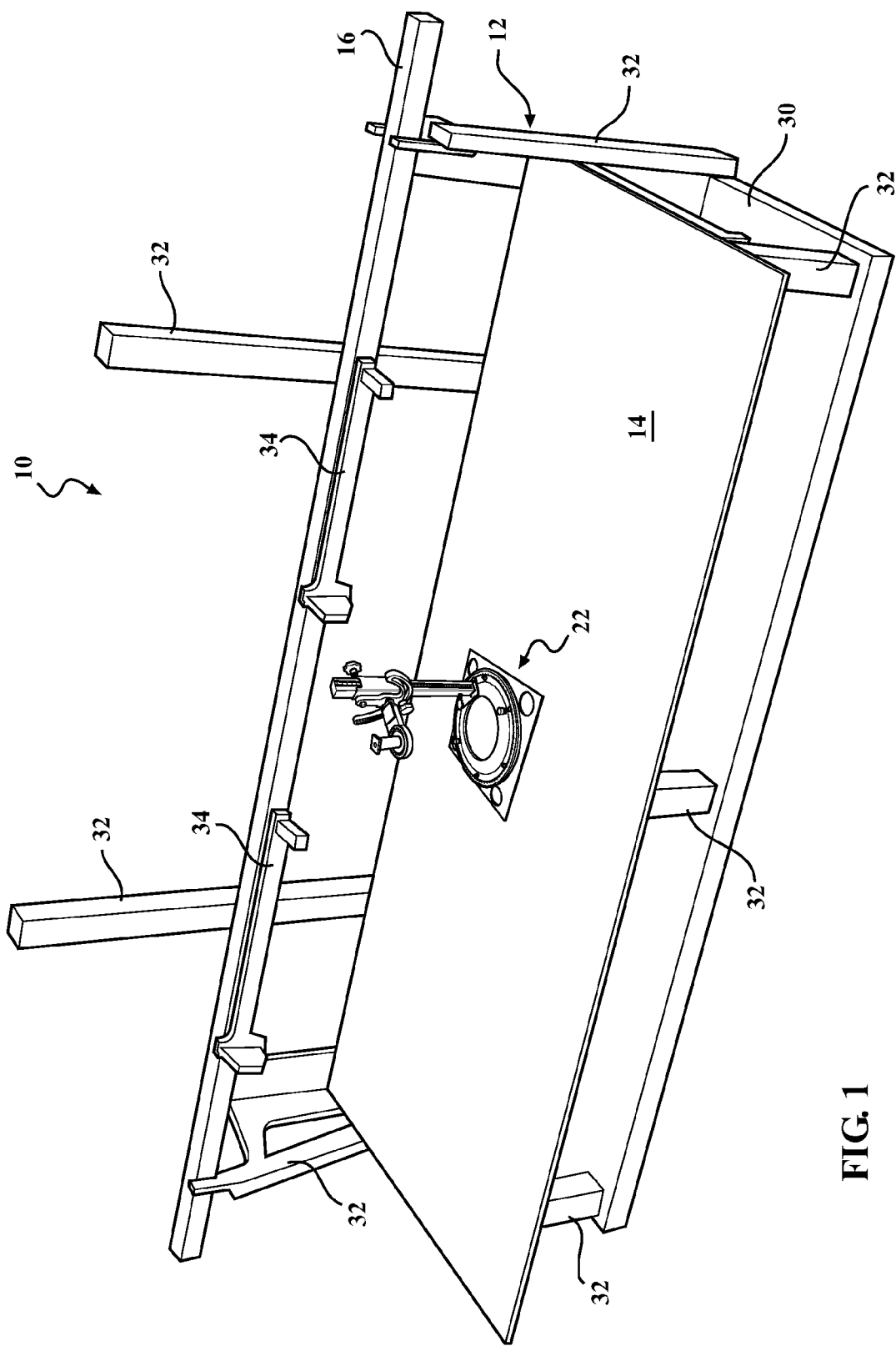
FIG. 1 is a perspective view of the method and apparatus for accurately positioning automated modular tooling.

The disclosure herein relates to a method and apparatus for accurately assembling and positioning automated modular tooling without the use of a sample of a workpiece or a physical model of the physical workpiece. A computer software program executed by a geometric analysis system is provided with information describing a three-dimensional computer model of the workpiece. Using the computer software program, locations on a surface represented in the three-dimensional computer model are selected as representing the locations at which supporting elements of the modular tooling are intended to engage the workpiece. The computer software program then calculates position data for the supporting elements of the modular tooling. The position data is used to build the modular tooling. In one implementation, the modular tooling is built using a table and an adjustable multi-dimensional gauge. When the gauge is positioned with respect to the table and adjusted according to the position data, a portion of the adjustable multi-dimensional gauge is located according to the location for one of the supporting elements of the modular tooling, thereby allowing the modular tooling to be assembled according to the location of the adjustable multi-dimensional gauge.

As seen in FIGS. 1-7, an apparatus 10 for accurately assembling and positioning automated modular tooling includes a table 12 having a work surface 14. The work surface 14 can be substantially planar and substantially flat. The table 12 also provides a rail 16 extending across the table 12 and above the work surface 14. The rail 16 is connectable to various modular tooling 18 including, but not limited to, tooling arms, boom rods, elbows, clamps, vacuum cups, grippers, locators, etc. The intended use of the modular tooling 18 is to engage and manipulate a workpiece, which may include, but is not limited to, sheet metal panels, stampings, machined parts, glass panels, etc.

The method and apparatus 10 also provides a gauge 22, which rests on and is supported by the work surface 14 of the table 12. The gauge 22 can be adjustable and multi-dimensional. The gauge 22 is positioned on the work surface 14 of the table 12 through the use of an XY coordinate system, wherein X and Y axes 24 are inscribed on the work surface 14 of the table 12. The gauge 22 provides a locating structure for positioning a workpiece engaging device 82 with respect to the gauge 22. In the illustrated example, the locating structure is a tool mount 26 that is connectable to the workpiece engaging device 82, which is positioned on an end of the modular tooling 18. The gauge 22 provides adjustable measurements of the tool mount 26 in various linear, angular, and rotational directions.

A geometric analysis system 28 calculates and determines the geometric spatial coordinates of the tool mount 26 relative to the table 12 and the modular tooling 18 and is configured to output three-dimensional design information representing a configuration for the modular tooling 18. The three-dimensional design information can include position data describing a position for an engaging member of the modular tooling 18. The position data can include an x-value, a y-value, a z-value, and one or more rotation values, such as a first rotation value, a second rotation value and a third rotation value. As will be explained herein, the position values can refer to settings for the gauge 22.

The geometric analysis system 28 can be a computer implemented system. For example, the geometric analysis system 28 can include computer-aided design (CAD) software that is adapted to calculate and determine the geometric spatial coordinates of the tool mount 26 relative to the table 12 and the modular tooling 18. The geometric analysis system 28 provides the exact settings for all of the dimensional adjustments provided on the gauge 22 and the work surface 14 of the table 12. By properly adjusting the dimensional adjustments of the gauge 22 and the position of the gauge 22 relative to the work surface 14 of the table 12, as provided by the geometric analysis system 28, the exact location of the tool mount 26 can be determined without the use of a physical sample of the workpiece or a physical model of the workpiece.

When the tool mount 26 is in its proper position, the modular tooling 18 can be assembled and positioned by extending the modular tooling 18 from the rail 16 of the table 12 to the tool mount 26 on the gauge 22. The modular tooling 18 can include multiple portions that are relatively adjustable with respect to one another during assembly but that, once assembled, can be held in a fixed positional relationship with respect to one another. Once the modular tooling 18 is properly assembled and positioned, the modular tooling 18 may be removed from the table 12 and shipped to the end user, wherein the end user may mount the modular tooling 18 directly to the intended machine. The intended machine can include, for example, an automated positioning system such as a robot arm or moving rail that is adapted to move the modular tooling 18 while the modular tooling 18 retains its assembled configuration. Since the modular tooling 18 is properly assembled and positioned relative to the workpiece, the modular tooling 18 should require little, if any, positional adjustment by the end user. The modular tooling 18, once it is mounted, can be utilized for operations such as engaging and picking up and moving the workpiece that it was designed to be utilized with.

In order to establish a reference plane for the method and apparatus 10, the table 12 has a substantially elongated rectangular configuration having a heavy base portion 30 for ensuring the stability of the table 12, as seen in FIG. 1. A plurality of legs 32 extend through and upward from the base and support the work surface 14. The work surface 14 of the table 12 has position indicia thereon, such as X and Y coordinates or axes inscribed on the work surface 14 of the table 12. As will be seen later, the geometric analysis system 28 identifies and provides these values as the "X value" and the "Y value." The rail 16 is connected to two of the legs 32 of the table 12, wherein the rail 16 is positioned above a back edge of the work surface 14 of the table 12. A pair of quick disconnect bar attachments 34 may be connected to the rail 16 of the table 12 to allow the modular tooling 18 to be quickly connected to and disconnected from the quick disconnect bar attachments 34 on the rail 16. The rail 16 and/or the quick disconnect bar attachments 34 replicate the intended manipulator or machinery for which the modular tooling 18 will ultimately be connected thereto. The dimensions of the work surface 14 of the table 12, as well as the dimensions of the rail 16, and the relative distances between the rail 16 and the work surface 14 are programmed into the geometric analysis system 28 such that the geometric analysis system 28 can provide and generate a computer model of the table 12. This will be used to generate the required location of the gauge 22 on the work surface 14 of the table 12, as will be described later in the specification.

Figure 2:
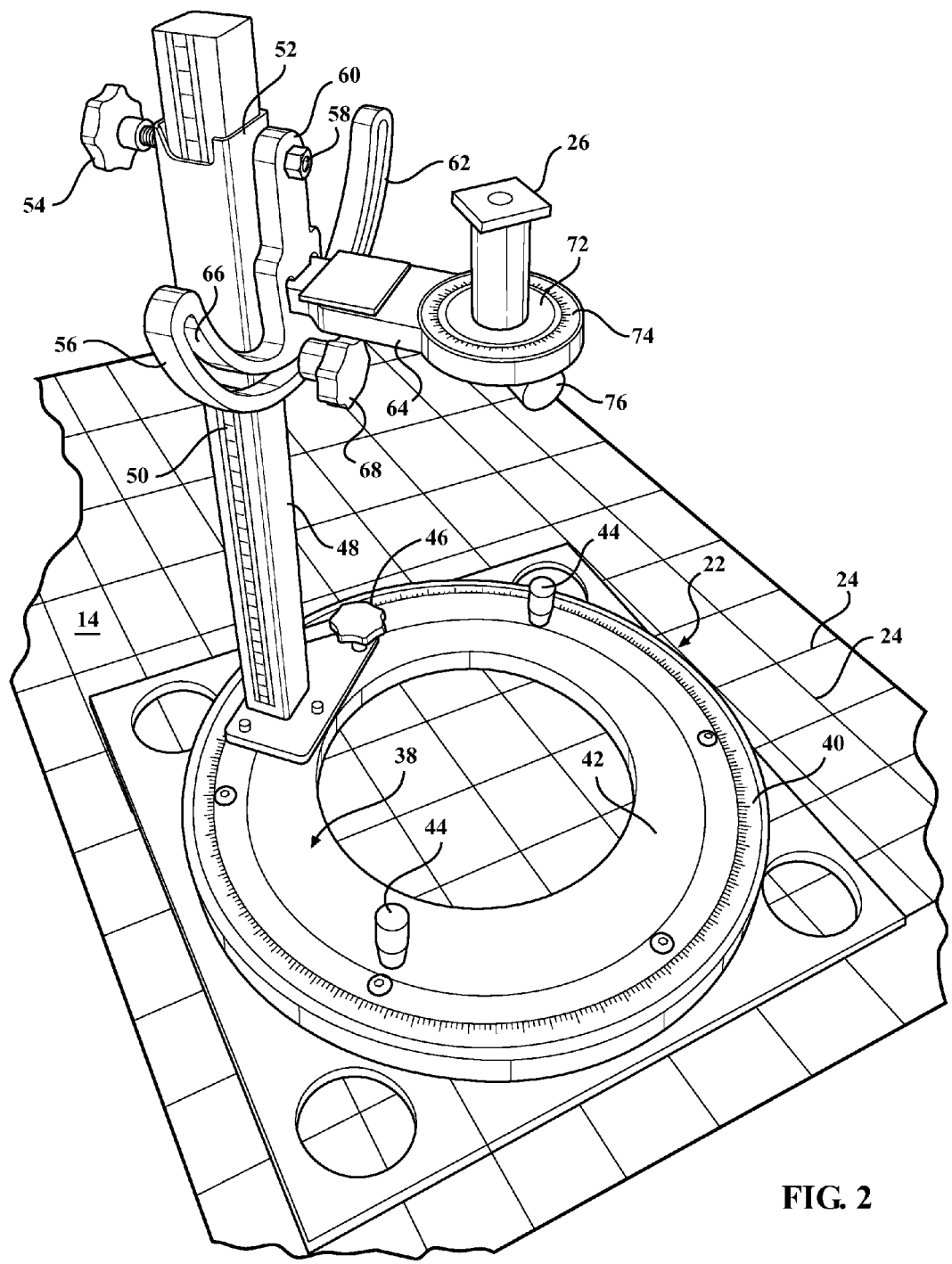
FIG. 2 is a perspective view of the gauge of the method and apparatus for accurately positioning automated modular tooling.
Figure 3:
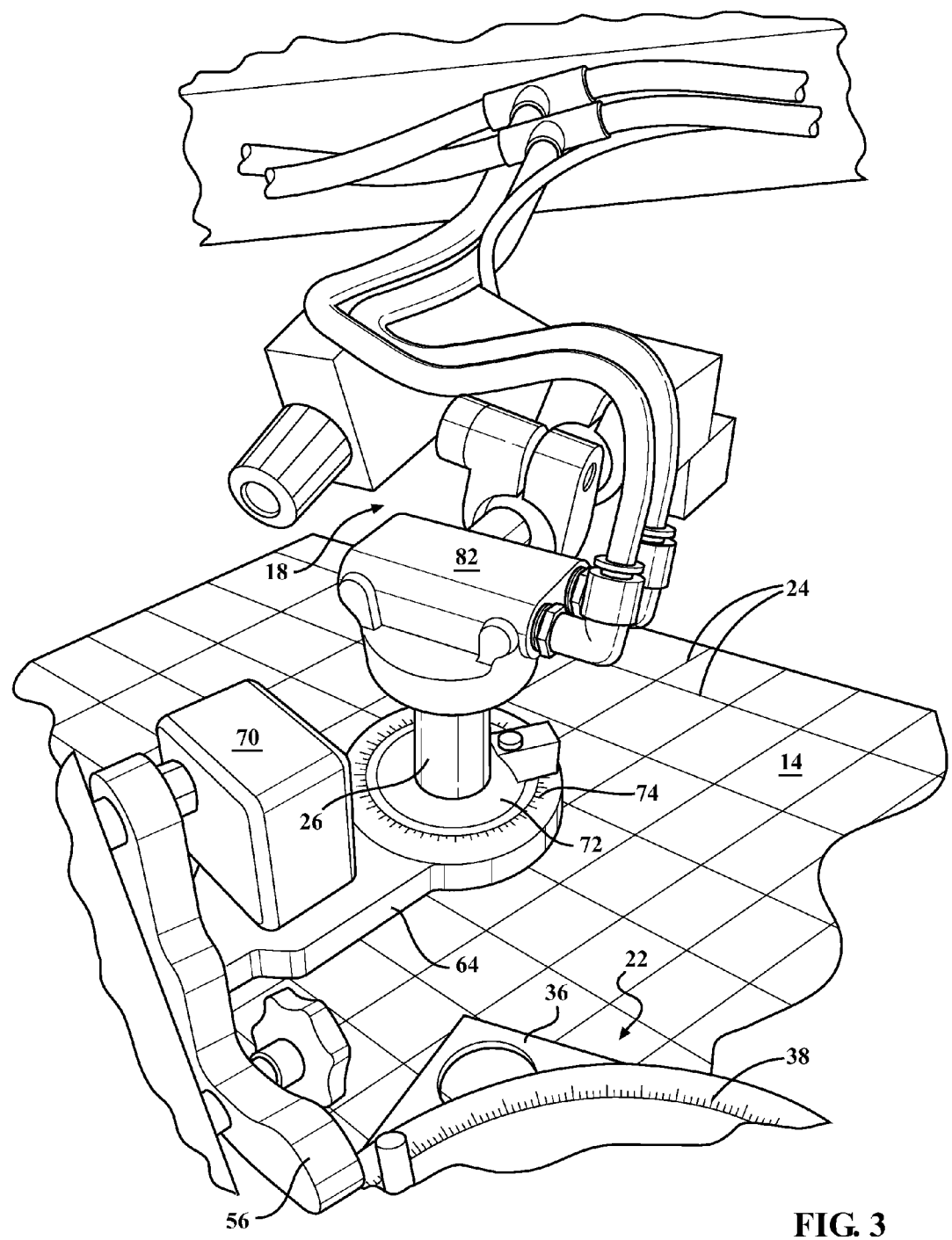
FIG. 3 is a perspective view of the gauge of the method and apparatus with the automated modular tooling connected to the tool mount.

To properly position the tool mount 26, the gauge 22 provides accurate multi-dimensional positioning of the tool mount 26 for properly assembling and positioning the modular tooling 18. As seen in FIGS. 2-3, the gauge 22 has a base 36 that is fabricated from a clear transparent polymeric material such that the work surface 14 of the table 12 can be viewed through the base 36. The base 36 can be substantially square or substantially rectangular, wherein the modifier "substantially" indicates that deviations from such a shape due to normal manufacturing tolerance and limits are included within the scope of the phase. Other shapes can be used for the base 36.

A rotational gauge or circular gauge 38 can be mounted on the base 36 of the gauge 22, and has indicia 40 corresponding to a "base angle" up to 360°. A circular plate 42 is co-axially and rotatably connected to the inner portion of the circular gauge 38 and is rotatably supported on the circular gauge 38 by ball bearings (not shown). The circular plate 42 can be substantially circular, in that deviations from a true circular shape are permissible to the extent that those deviations do not prevent rotation with respect to a complementary annular member, such as the circular gauge 38. A pair of small handles 44 are each connected to and extend upward from the circular plate 42 to assist an assembler in rotating the circular plate 42 relative to the circular gauge 38. The circular plate 42 provides a base rotational adjustment of the tool mount 26, and the indicia 40 on the circular gauge 38 indicates the exact base angle of the tool mount 26 relative to the circular gauge 38. The geometric analysis system 28 will provide an exact "base angle value" to properly position the tool mount 26. A fastener 46 may be utilized on the circular plate 42 to lock the circular plate 42 into a stationary position. The fastener is engageable and releasable, in order to establish a locked position and a released position for the circular plate 42 with respect to the circular gauge 38. The fastener 46 extends through an aperture provided in the circular plate 42 and may further extend into a threaded aperture provided in a portion of the circular gauge 38 that does not rotate with respect to the circular plate 42. Thus, when the fastener 46 is threaded into the aperture in the circular gauge 38, the circular plate 42 is locked into position and cannot rotate. When the fastener 46 is withdrawn from the aperture in the circular gauge 38, the circular plate 42 is unlocked and free to rotate.

In order to provide linear adjustment of the tool mount 26 in the Z coordinate or axis, the gauge 22 provides a riser 48 that is connected to and extends upward from the circular gauge 38. The riser 48 can be substantially rectangular, rigid, and hollow. Indicia 50 are located on the outside surface of the riser 48 to indicate the height at a particular location on the riser 48 from the work surface 14 of the table 12. A slide 52 is positioned over the riser 48. The slide 52 is adjustable with respect to the riser and may slide vertically along the riser 48. A releasable locking structure such as a threaded fastener 54 extends through the slide 52 and threads into an aperture provided in the riser 48 to releasably secure the slide 52 to the riser 48 in a locked position. The top edge of the slide 52 extends across the indicia 50 on the outside surface of the riser 48 to indicate the vertical linear distance along the Z axis of the tool mount 26 from the work surface 14 of the table 12. The geometric analysis system 28 will provide an exact value for the Z axis to properly position the tool mount 26, relative to the modular tooling 18, and the Z axis value will be identified by the geometric analysis system 28 as the "Z value."

To provide an angular or "tilt angle" adjustment of the tool mount 26, the gauge 22 provides a swing arm 56 that is pivotally connected to the slide 52 by a pivot pin 58. The swing arm 56 has a substantially straight and rectangular portion 60 that is integrally connected to a semi-circular portion 62. The straight portion 60 of the swing arm 56 has a free end connected to the pivot pin 58, and the opposite end of the straight portion 60 of the swing arm 56 is connected to a mounting plate 64. The mounting plate 64 extends outward from the swing arm 56 and helps to support the tool mount 26, as will be described later in the specification. The semi-circular portion 62 of the swing arm 56 has a semi-circular slot 66 extending therethrough for receiving a fastener 68 that extends through the semi-circular slot 66 and into a threaded aperture provided in the slide 52. The fastener 68 may be threaded into the threaded aperture provided in the slide 52 to secure the swing arm 56 in a locked position, or the fastener 68 may be threaded outward from the slide 52, thereby allowing the swing arm 56 to pivot about the pivot pin 58 along the semi-circular slot 66 of the swing arm 56. Indicia (not shown) may be provided on the swing arm 56 to indicate the angular position of the tool mount 26, or an electronic angular measurement device 70 may be connected to the mounting plate 64 to indicate the angular position of the tool mount 26. This adjustment will be referred to as the "tilt angle" and will be provided by the geometric analysis system 28.

In order to provide additional rotational adjustment or "mount twist" of the tool mount 26, the gauge 22 provides a rotational gauge 72 on the end of the mounting plate 64. The tool mount 26 is connected to the center of the rotational gauge 72, and indicia 74 are provided on the outer circumference of the rotational gauge 72 to indicate the rotational position of the tool mount 26 relative to the rotational gauge 72. A fastener 76 on the underside of the rotational gauge 72 allows the rotational gauge 72 to be secured in a locked position when the fastener 76 is tightened, thereby prohibiting the rotational gauge 72 from rotating. To allow the rotational gauge 72 to rotate, the fastener 76 may be unthreaded from the rotational gauge 72 to an unlocked position. The geometric analysis system 28 will provide an exact value for the "mount twist" in order to properly position the tool mount 26 relative to the modular tooling 18.

Figure 4:
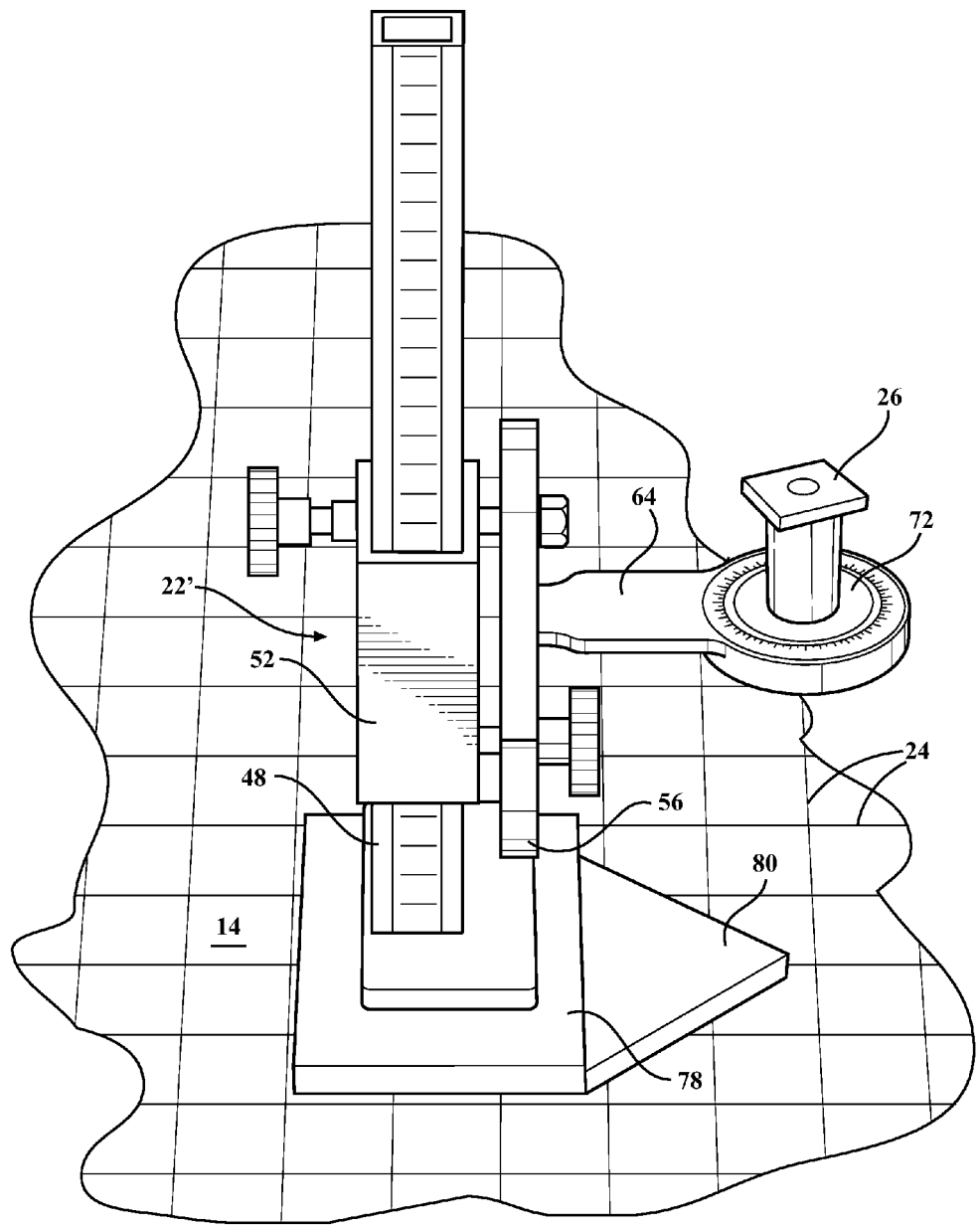
FIG. 4 is a perspective view showing a triangular-shaped base of the gauge of the method and apparatus for accurately positioning automated modular tooling.
Figure 6:
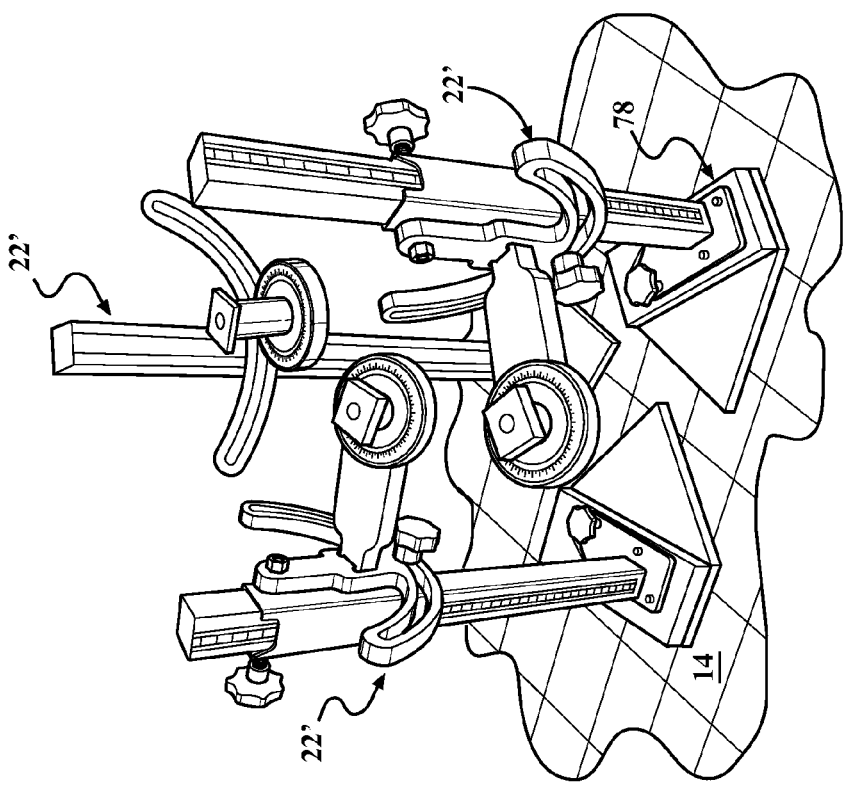
FIG. 6 is a perspective view showing the method and apparatus using a plurality of triangular base gauges.
Figure 5:
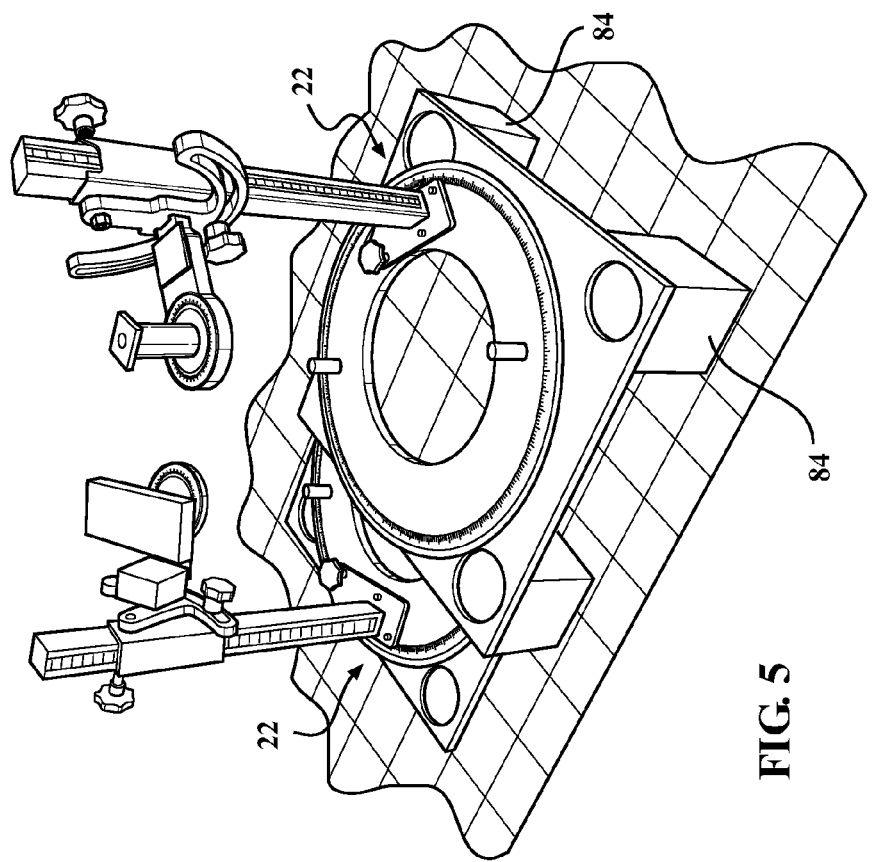
FIG. 5 is a perspective view showing the method and apparatus using a plurality of rectangular base gauges.

In the event that the base 36 of the gauge 22 is too large for a particular application, a second embodiment of the gauge 22' may be provided, as seen in FIG. 4. The gauge 22' of the second embodiment provides a base 78 that has a substantially triangular-shaped portion 80 that is substantially transparent and extends from a substantially rectangular central portion of the base 78. The substantially triangular-shaped portion 80 may be used as a protractor, thereby providing a rotational adjustment or "base angle" similar to that provided in the first embodiment of the gauge 22. However, the smaller base 78 of the second embodiment of the gauge 22' allows for multiple gauges 22' to be utilized when several workpiece engaging devices 82 are being used on the modular tooling 18. FIG. 6 shows three gauges, each of which is identical to the gauge 22' of the second embodiment, being utilized in such a manner. In a similar situation where multiple workpiece engaging devices 82 are utilized on the modular tooling 18, two gauges, each identical to the gauge 22 of the first embodiment, can be utilized by stacking the bases 36 of the gauges, as shown in FIG. 5. Here, substantially cubed blocks 84 having predetermined sizes are utilized to allow the bases 36 of the gauges 22 to be stacked atop one another in an overlapping position.

Figure 7:
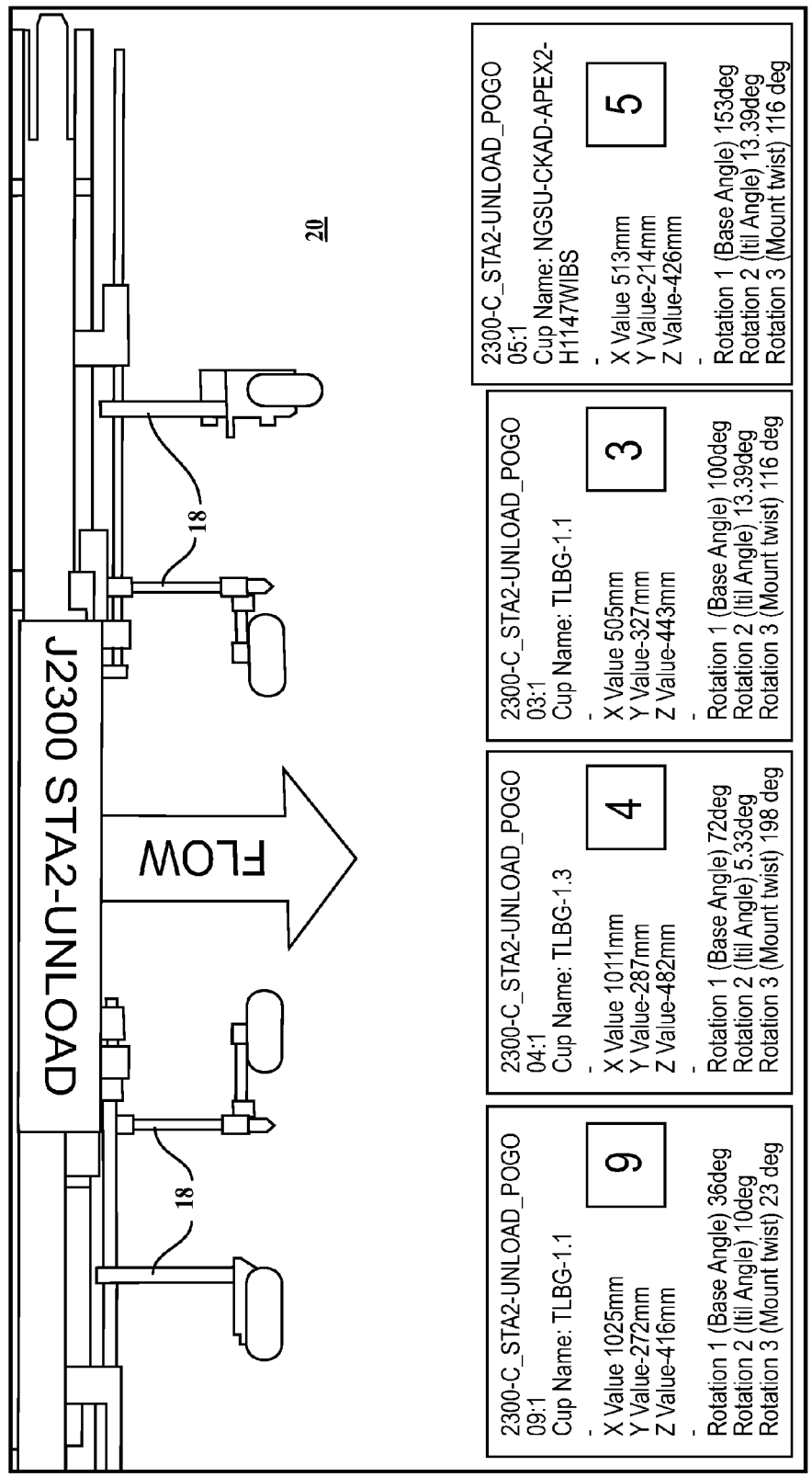
FIG. 7 is a first interface screen output for display by a computer-implemented geometric analysis system showing geometric coordinates for the method and apparatus for accurately positioning automated modular tooling.
Figure 8:
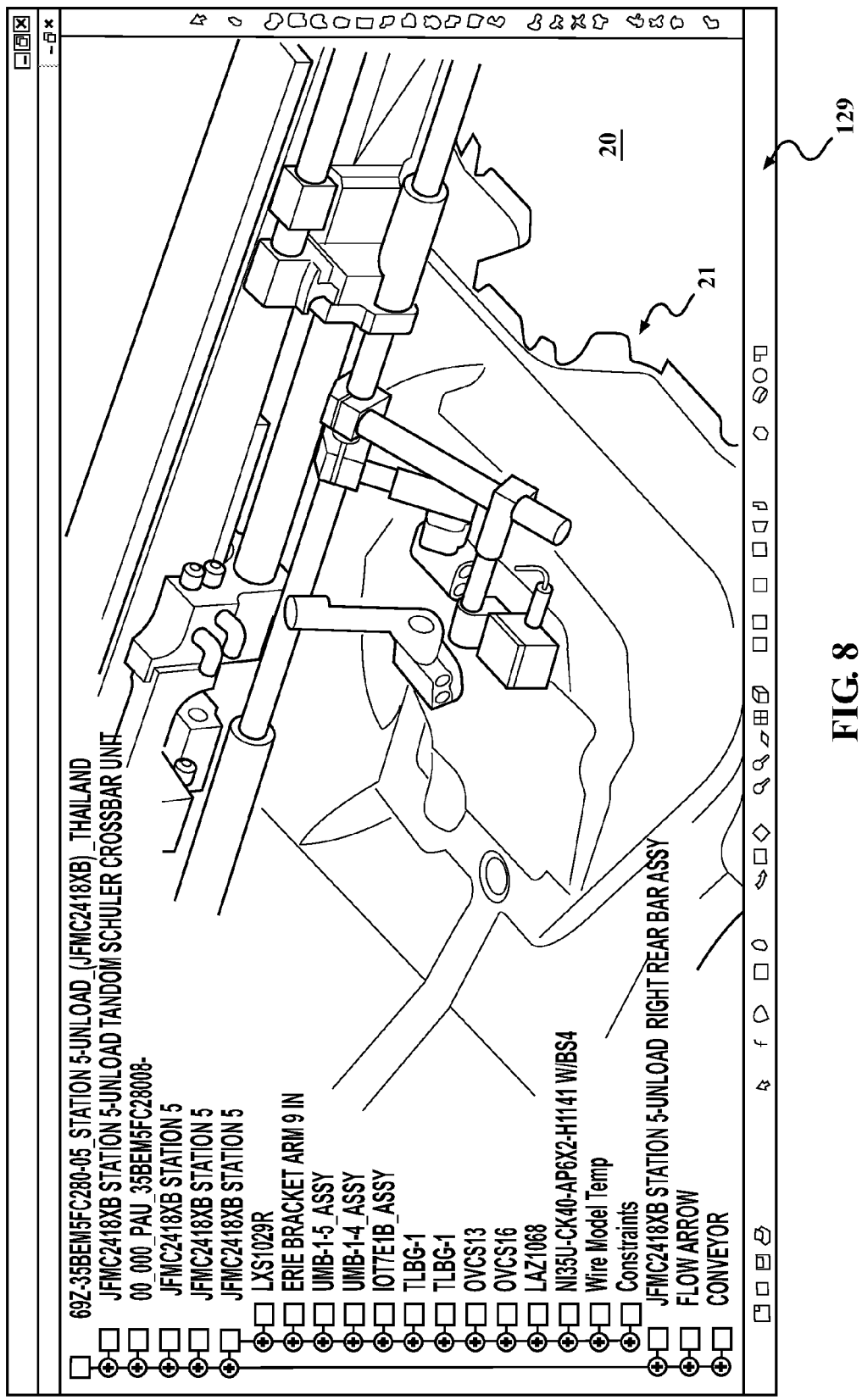
FIG. 8 is a second interface screen output for display by a computer-implemented geometric analysis system showing a three dimensional computer model of the workpiece and modular tooling of the method and apparatus.

In order to determine the specific linear, rotational, and angular adjustment of the tool mount 26 relative to the gauge 22, the geometric analysis system 28 generates a computer model 20 that represents the table 12 and the multi-dimensional adjustments of the gauge 22, as seen in FIGS. 7-8, which show a first interface screen 128 and a second interface screen 129 that are generated and output by the geometric analysis system. In addition, the geometric analysis system 28 is also provided with information representing a three-dimensional configuration of the workpiece, and based on this information, the computer model 20 includes a three dimensional computer model 21 of the workpiece and the modular tooling 18 in conjunction with the computer model of the table 12 and gauge 22. The geometric analysis system 28 calculates where the modular tooling 18 should be placed relative to the workpiece. That is, the geometric analysis system 28 determines the geometric, spatial orientation as to where the workpiece engaging devices 82 should engage the workpiece relative to the table 12 and gauge 22.

Upon generating the necessary computer models, the geometric analysis system 28 determines the exact settings and values for each of the positional adjustments of and on the gauge 22, as previously described, i.e., "X value," "Y value," "Z value," "base angle," "tilt angle," and "mount twist." As seen in FIG. 7, the geometric analysis system 28 outputs and displays the settings and values for which the gauge 22 should be located and for which the dimensional settings on the gauge 22 should be set at a first interface screen 128, and the assembler proceeds to set the position of the gauge 22 and the geometric multi-dimensional adjustments on the gauge 22 accordingly.

Figure 9:
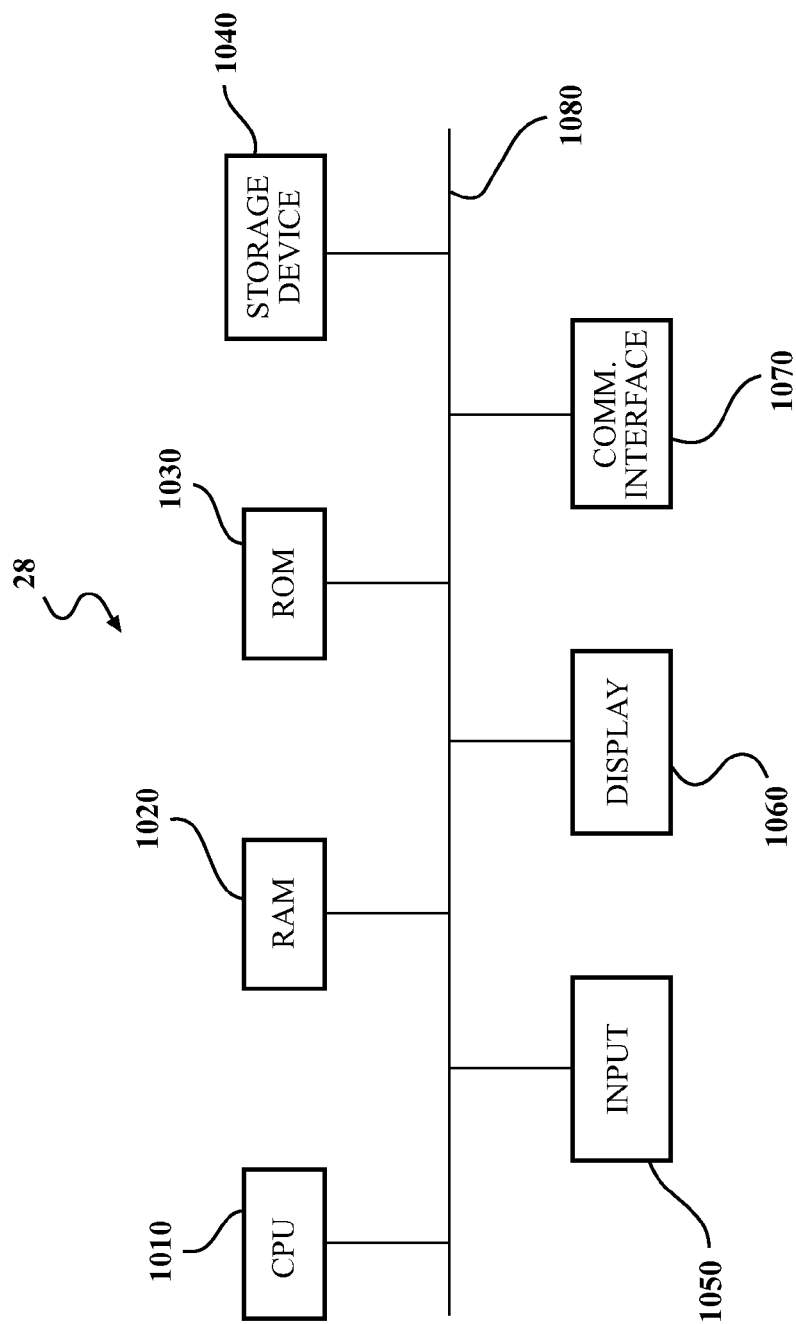
FIG. 9 is a block diagram showing an example configuration for the geometric analysis system.

An example of a configuration for the geometric analysis system 28 is shown in FIG. 9. The geometric analysis system can, however, be implemented using any suitable conventional computer, such as in the form of a desktop computer, server computer, laptop computer, tablet computer, or smart phone, provided with computer program instructions that cause the conventional computer to perform the functions and operations described herein. As an example, the geometric analysis system 28 can include a processor such as a central processing unit (CPU) 1010 and memory such as RAM 1020 and ROM 1030. A storage device 1040 can be provided in the form of any suitable computer readable medium, such as a hard disk drive. The storage device 1040 can be a non-transitory computer readable medium. The computer program instructions can be stored at the storage device 1040. One or more input devices 1050, such as a keyboard and mouse, a touch screen interface, etc., allow user input to be provided to the CPU 1010. A display 1060, such as a liquid crystal display (LCD) or a cathode-ray tube (CRT), allows output to be presented to the user. The input devices 1050 and the display 1060 can be incorporated in a touch sensitive display screen. A communications interface 1070 is any manner of wired or wireless means of communication that is operable to send and receive data or other signals using a bus network 1080. The CPU 1010, the RAM 1020, the ROM 1030, the storage device 1040, the input devices 1050, the display 1060 and the communications interface 1070 are all connected to one another by the bus network 1080.

In use, the dimensions of the table 12 and the gauge 22 are programmed into the geometric analysis system 28 along with the dimensions of the workpiece and the modular tooling 18. The desired location of the workpiece engaging device 82 relative to the workpiece is also programmed into the geometric analysis system 28. The geometric analysis system 28 then generates the positional settings of the gauge 22 by generating a computer model representing the table 12, the gauge 22, the workpiece, and the modular tooling 18 compiled together.

Once the geometric analysis system 28 generates the positional settings, the assembler first reads the "X value" and the "Y value" from the geometric analysis system 28. The assembler marks the "X value" and the "Y value" on the work surface 14 of the table 12, and the base 36 of the gauge 22 is centered on the point defined by the X and Y values. The assembler then reads the "Z value" from the geometric analysis system 28 and adjusts the slide 52 on the riser 48 of the gauge 22 to the appropriate value noted on the indicia 50 of the riser 48. The slide 52 is then locked into the Z value position by the fastener 54. The assembler then reads the "base angle" value from the geometric analysis system 28 corresponding to the circular gauge 38 of the gauge 22. The circular plate 42 on the circular gauge 38 is rotated to the "base angle" value noted on the indicia 40, and the circular plate 42 is locked in place at the predetermined "base angle" value by the fastener 46. The assembler then reads the "tilt angle" on the geometric analysis system 28 which corresponds to the position of the swing arm 56 on the gauge 22. The swing arm 56 is pivoted on the pivot pin 58 and along the semi-circular slot 66 until the swing arm 56 is in the position noted by the "tilt angle" value on the geometric analysis system 28. The swing arm 56 is locked into that position by the fastener 68. Lastly, the assembler references the "mount twist" value on the geometric analysis system 28 provided on the rotational gauge 72 of the mounting plate 64. The rotational gauge 72 is rotated into the proper position as indicated by the indicia 74, and the fastener 76 is tightened to lock the rotational gauge 72 into the desired position.

The tool mount 26 is now in the proper geometrical spatial position, wherein the modular tooling 18 can be built thereto. The modular tooling 18 is connected to the quick disconnect bar attachment 34 on the rail 16 and may be adjusted and configured until the workpiece engaging device 82 engages the tool mount 26 on the gauge 22 in the desired position. Thus, a modular tooling structure such as the modular tooling 18 is assembled using the design information such that a first end of the modular tooling structure is connected to a base structure, such as the rail 16 of the quick disconnect bar attachment 34 and at least one engagement member of modular tooling structure, such as the workpiece engaging device 82, is positioned at a second end of the modular tooling structure and is in engagement with a portion of the gauge 22, such as the tool mount 26.

Once the modular tooling 18 is properly configured, the modular tooling 18 may be removed from the quick disconnect bar attachment 34 on the rail 16 of the table 12, and the modular tooling 18 may be shipped to the end user, wherein the modular tooling 18 may be connected directly to the end user's machinery with little, if any, adjustment to the modular tooling 18. The apparatus and method thereby increases the efficiency of assembling and positioning the modular tooling 18 by eliminating the cost and time associated with using a sample of the workpiece or a model of the workpiece, thereby eliminating the cost and time associated with creating and using a sample of the workpiece or a model of the workpiece.

While the disclosure herein is made in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for accurately assembling and positioning a modular tooling structure for manipulating a workpiece, comprising:
   generating, at one or more computers, three dimensional design information representing a configuration for the modular tooling structure, wherein the three dimensional design information includes position data describing a position for at least one engaging member of the modular tooling structure with respect to the workpiece, the position data comprising an x-value, a y-value, and a z-value;
   physically positioning a multi-dimensional gauge with respect to a base structure based on the position data; and
   physically assembling the modular tooling structure independent from the workpiece by using the three dimensional design information such that a first end of the modular tooling structure is removably connected to the base structure and the at least one engagement member is positioned at a second end of the modular tooling structure and is in engagement with the multi-dimensional gauge, wherein the position of the at least one engaging member of the modular tooling structure is maintained when the modular tooling structure is disconnected from the base structure.

2. The method of claim 1, wherein the position data further comprises at least one rotation value.

3. The method of claim 2, wherein the at least one rotation value includes a first rotation value, a second rotation value, and a third rotation value.

4. The method of claim 1, wherein the multi-dimensional gauge includes a plurality of adjustable portions, the position data includes a plurality of position values, and positioning the multi-dimensional gauge includes setting each adjustable portion from the plurality of adjustable portions according to a respective position value from the plurality of position values.

5. The method of claim 1, wherein the position data includes an x-value and a y-value, and positioning the multi-dimensional gauge includes positioning the multi-dimensional gauge with respect to a table using position indicia formed on the table.

6. The method of claim 1, wherein the multi-dimensional gauge includes a locating structure, and positioning the multi-dimensional gauge includes setting a height of the locating structure according to the z-value.

7. The method of claim 1, wherein the position data includes at least one rotation value, the multi-dimensional gauge includes at least a first rotationally adjustable structure, and positioning the multi-dimensional gauge includes rotationally adjusting the first rotationally adjustable structure based on the at least one rotation value.

8. The method of claim 1, further comprising:
   subsequent to assembling the modular tooling, connecting the modular tooling to a machine; and
   manipulating the workpiece using the modular tooling while the modular tooling is connected to the machine.

9. A method for accurately assembling and positioning a modular tooling structure for manipulating a workpiece, comprising:
   receiving, at one or more computers, three dimensional model information describing the workpiece;
   generating, at the one or more computers, three dimensional design information representing a configuration for the modular tooling structure based on the three dimensional model information, wherein the three dimensional design information includes position data describing a position for at least one engaging member of the modular tooling structure with respect to the workpiece, the position data comprising an x-value, a y-value, and a z-value;
   physically positioning a multi-dimensional gauge with respect to a base structure based on the position data by positioning the multi-dimensional gauge with respect to a table having position indicia thereon based on the position data and setting at least one adjustable portion of the multi-dimensional gauge based on the position data; and
   physically assembling the modular tooling structure independent from the workpiece by using the three dimensional design information such that a first end of the modular tooling structure is removably connected to the base structure and the at least one engagement member is positioned at a second end of the modular tooling structure and is in engagement with a locating structure of the multi-dimensional gauge, wherein the position of the at least one engaging member of the modular tooling structure is maintained when the modular tooling structure is disconnected from the base structure.

10. The method of claim 9, wherein the position data further comprises at least one rotation value.

11. The method of claim 10, wherein the at least one rotation value includes a first rotation value, a second rotation value, and a third rotation value.

12. The method of claim 9, wherein the multi-dimensional gauge includes a plurality of adjustable portions, the position data includes a plurality of position values, and positioning the multi-dimensional gauge includes setting each adjustable portion from the plurality of adjustable portions according to a respective position value from the plurality of position values.

13. The method of claim 9, wherein the position data includes an x-value and a y-value, and positioning the multi-dimensional gauge includes positioning the multi-dimensional gauge with respect to a table using position indicia formed on the table.

14. The method of claim 9, wherein the multi-dimensional gauge includes a locating structure, and positioning the multi-dimensional gauge includes setting the height of the locating structure according to the z-value.

15. The method of claim 9, wherein the position data includes at least one rotation value, the multi-dimensional gauge includes at least a first rotationally adjustable structure, and positioning the multi-dimensional gauge includes rotationally adjusting the first rotationally adjustable structure based on the at least one rotation value.

16. The method of claim 9, further comprising:
subsequent to assembling the modular tooling, connecting the modular tooling to a machine; and
manipulating the workpiece using the modular tooling while the modular tooling is connected to the machine.

17. A method for accurately assembling and positioning a modular tooling structure for manipulating a workpiece, comprising:
receiving, at one or more computers, three dimensional model information describing the workpiece;
generating, at the one or more computers, three dimensional design information representing a configuration for the modular tooling structure based on the three dimensional model information, wherein the three dimensional design information includes position data describing a position for at least one engaging member of the modular tooling structure with respect to the workpiece, and the position data includes an x-value, a y-value, a z-value, and at least one rotation value;
positioning a multi-dimensional gauge with respect to a base structure based on the position data by positioning the multi-dimensional gauge with respect to a table having position indicia thereon based on the x-value and the y-value from the position data, setting a height of a locating structure of the multi-dimensional gauge according to the z-value, and rotationally adjusting a first rotationally adjustable structure of the multi-dimensional gauge based on a first rotation value; and
assembling the modular tooling structure independent from the workpiece by using the three dimensional design information such that a first end of the modular tooling structure is removably connected to the base structure and the at least one engagement member is positioned at a second end of the modular tooling structure and is in engagement with the locating structure of the multi-dimensional gauge, wherein the position of the at least one engaging member of the modular tooling structure is maintained when the modular tooling structure is disconnected from the base structure.

18. The method of claim 17, wherein the at least one rotation value includes a second rotation value and a third rotation value.

19. The method of claim 18, wherein the multi-dimensional gauge includes a second rotationally adjustable structure and a third rotationally adjustable structure, and positioning the multi-dimensional gauge includes setting the second rotationally adjustable structure and the third rotationally adjustable structure based on the second rotation value and the third rotation value, respectively.

20. The method of claim 17, further comprising:
subsequent to assembling the modular tooling, connecting the modular tooling to a machine; and
manipulating the workpiece using the modular tooling while the modular tooling is connected to the machine.

* * * * *